June 29, 1943.    M. GOLDSCHMIDT    2,323,216
METHOD OF MAKING RESILIENT COUPLINGS
Original Filed July 2, 1942    2 Sheets-Sheet 1

Max Goldschmidt
By Harness Dickey & Pierce
attys

June 29, 1943.   M. GOLDSCHMIDT   2,323,216
METHOD OF MAKING RESILIENT COUPLINGS
Original Filed July 2, 1942   2 Sheets-Sheet 2
FIG. 5
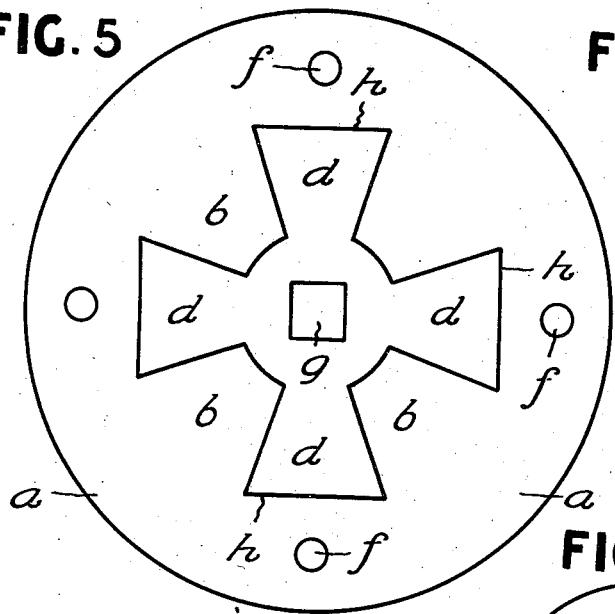
FIG. 7
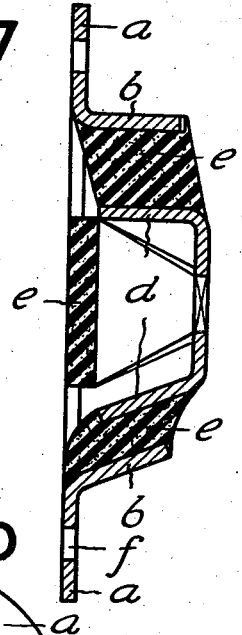
FIG. 10
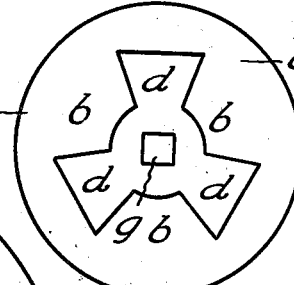
FIG. 6
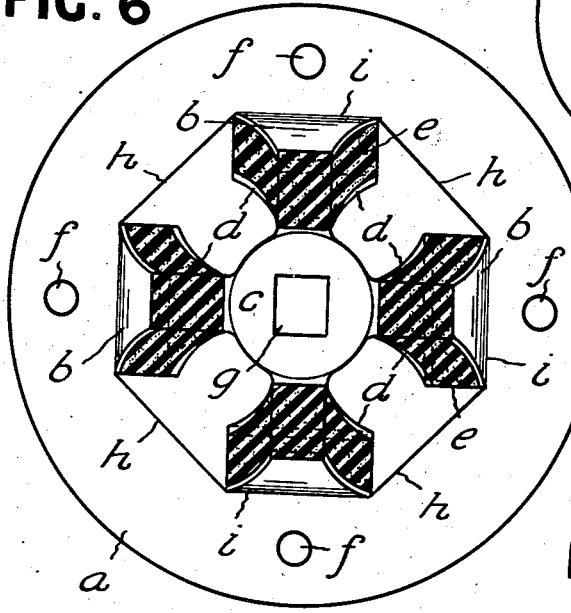
FIG. 8
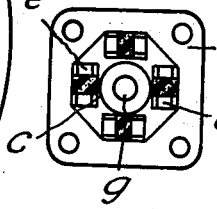
FIG. 11
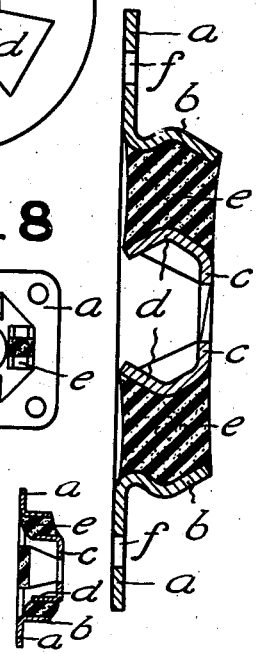
FIG. 9
Max Goldschmidt
By Harness Dickey + Pierce
Attys Patented June 29, 1943

2,323,216

UNITED STATES PATENT OFFICE 2,323,216

METHOD OF MAKING RESILIENT COUPLINGS

Max Goldschmidt, Leicester, England, assignor to Metalastik Limited, Leicester, England, a British company Original application July 2, 1942, Serial No. 449,380. Divided and this application January 13, 1943, Serial No. 472,286. In Great Britain February 26, 1941

3 Claims. (Cl. 29—148)

Rubber and metal units for use as vibration insulators and resilient mountings for instruments, machines and the like are well known in which the metal parts form attachment means and load transmitting means and the rubber forms the resilient connection and shock-taking element. The metal parts are arranged in spacial relation and the rubber is bonded to them by a vulcanization process giving a very strong union.

This application is a division of applicant's co-pending case Serial No. 449,380, filed July 2, 1942.

It is an object of the invention to provide an economical and efficient method of manufacturing such rubber and metal units which facilitates their production.

It is an object of the invention so to construct and arrange the respective metal parts that when they are in the flat they are complementary and both are stamped or pressed in accordance with the improved method of manufacture from one metal sheet or plate, the blank for one part being formed by the metal displaced from the sheet or plate in forming the other.

It is a characteristic of the rubber and metal units produced by this improved method that the attachment part of one metal part shall be central and the attachment part of the complementary metal part shall be peripheral.

By this means both attachment parts can be annular and continuous metal members such as rings, polygons or squares or oblong rectangular figures with arms projecting inwardly therefrom for the one part, and circular discs, squares or oblong rectangular figures with outwardly directed arms for the other part. This makes stronger structures from any given thickness of metal.

The appended drawings illustrate various constructional forms of the invention.

Figures 5 and 6 are similar views to Figures 1 and 3 but showing the piercing of the blank and the pressing out of the arms made on straight lines.

Figure 7 is a cross section illustrating two forms of construction, with perpendicular arms on the left of the figure and inclined arms on the right.

Figures 8 and 9 are respectively plan and cross section of a unit with a square outline.

Figure 10 shows a blank for a three armed arrangement.

Figure 11 is a sectional view of a unit showing the arms of the members of angular section in a plane parallel with the axis.

As one simple example of construction we may stamp out a plate of the size required for the attachment part of the larger member, and pierce this blank by appropriate press tools to remove a maltese cross-like figure from the centre, leaving the surrounding outer part of the plate unmutilated except for the formation of holes for attachment screws or bolts. The maltese cross-like smaller member which is displaced from the plate has a central, flat disc in which a square or other hole for attachment purposes may be formed.

Projecting inwardly from the circular plate of the larger member are four equally spaced inwardly tapering arms, and radiating out from the flat disc of the smaller member are four outwardly increasing arms. The arms of both parts may be pressed out from the flat at suitable complementary inclinations or curves, or at right angles thereto and the smaller part will be assembled coaxially with the larger part and with its arms facing opposite the arms of the larger part in order that rubber pads or blocks may be bonded to the facing surfaces of all the arms.

Figure 1:
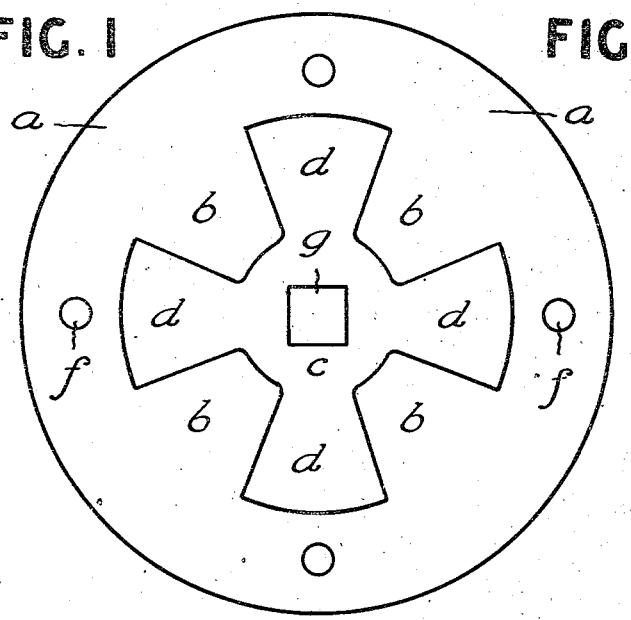
Figure 1 is a plan of a pierced blank.
Figure 2:
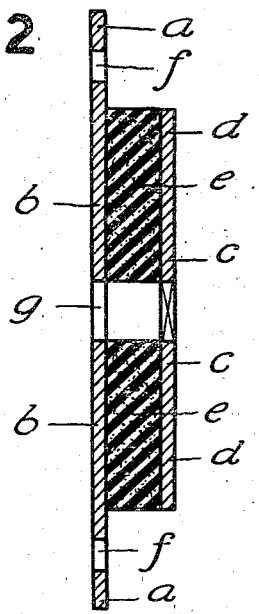
Figure 2 is a section through the rubber and metal unit of simplest form made therefrom.

In Figure 1 the metal plate is circular and a maltese cross-shaped blank is stamped out of the central part leaving a ring like blank with inwardly projecting arms. The ring like blank is marked $a$ and its inwardly projecting and tapering arms $b$ while the cruciform blank is marked $c$ and its arms $d$. The two blanks are coaxially assembled with the arms of the blank $c$ turned through an angle of 45° to bring them exactly opposite the arms $b$ of the blank $a$. In this position rubber may be bonded directly to the opposing faces of the arms to form the unit shown in Figure 2 in which $e$ represents the rubber which may be in ring form or in four blocks conforming in shape with the arms $b$ and $d$. Holes $f$ in the member $a$ enable this member of the unit to be secured by bolts, screw or like means to a surface, and a hole such as the square hole $g$ will enable the member $c$ to be secured and keyed against turning on another part such as a shaft.

Figure 4:
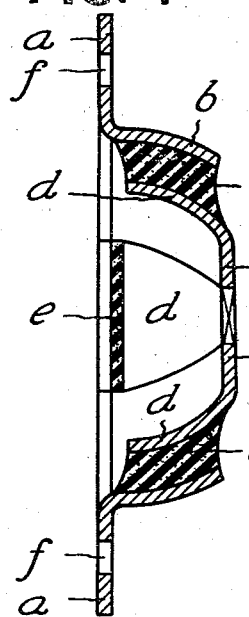
Figure 4 is a cross section through an assembled unit of the form shown in Figure 3 but with the arms complementarily curved from the shoulder to the end.
Figure 3:
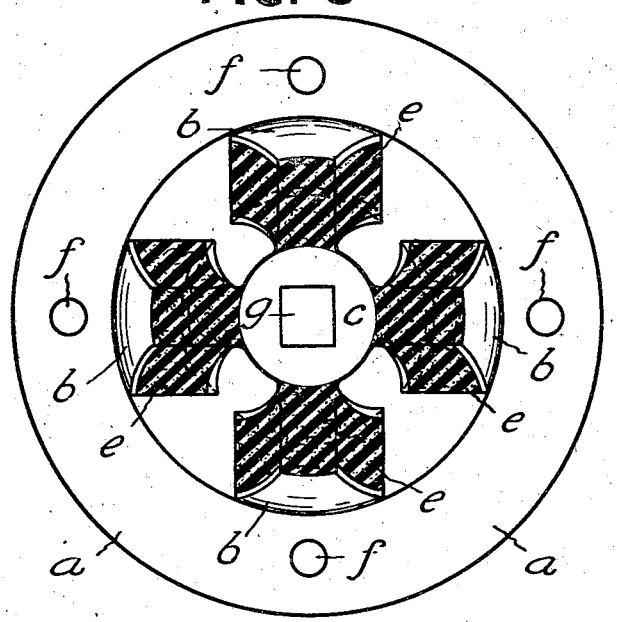
Figure 3 is a plan of an assembled unit in which the arms are pressed out from the plane of the two blanks made from the pierced blank shown in Figure 1 and are slightly curved circumferentially.

The arms b and d may be pressed out of the main plane of the respective blanks as shown in Figures 3 and 4 and this is the preferred arrangement. With the faces of the free ends of the arms d of the small blank c cut to a curve as shown in Figure 1, the blanks may be pressed so that the arms b and d have circumferential curvature, i. e. in a direction transverse to a line from root to tip. The arms at the roots where they bend from the flat blanks will then be part of a circle as seen in the face view, Figure 3.

The arms b and d may also be curved in the direction of the length of the arm from root to tip as more clearly shown in the cross sectional view, Figure 4.

In Figures 5 and 6 the blanking out operation is carried out so as to make a straight cut at h where the ends of the arms d are formed and the arms b are shown bent out from the blank on a chord at i instead of the curve as in Figure 3. Otherwise this construction resembles the construction illustrated in Figures 3 and 4.

In these arrangements, Figures 3 to 6, the inner smaller blank c is assembled with its flat disc-like part remote from the blank a and the ends of its arms adjacent the roots of the arms b; this renders the arms complementary to each other with the broad parts facing each other so that an approximately truncated triangular shaped rubber block e will conform in shape with a pair of opposed arms between which it is bonded.

As shown in the lower part of the sectional view at Figure 7 the arms b and d may be complementary inclines or as shown in the left upper part of that figure they may be perpendicular to the main plane of the respective metal parts a and c.

Figures 8 and 9 show a square blank a with arms b and d perpendicular to the blanks a and c.

In Figure 10 a blank for a three armed unit is shown instead of the cruciform arrangement previously described but the construction otherwise is the same.

The arms need not be stamped so as to use the whole of the metal in the original plate from which the two blanks a and c are formed. The overlapping arms may be of less width leaving scrap metal between them where the load to be resiliently taken by the rubber is not so large.

As will be seen from the form illustrated in Figure 3 the inner metal member may have some movement in all directions, in the manner of a so-called universal joint, relatively to the outer metal part. The rubber blocks would then be stressed in torsion, partly in shear, in compression and in tension according to the angular relative movements of the inner and outer parts.

The manufacture of the mounting unit is economical as the scrap metal from one blanking operation is utilised for the smaller metal part.

The complete rubber and metal unit thus formed may then be mounted between a supporting surface and an article or between two rotary members to be coupled, with the larger metal attachment part secured to the one surface and the smaller disc-like part secured to the other with their arms connected together by the rubber. The unit lends itself to use in almost any form of resilient mountings or couplings, whether designed for loading the rubber in compression, tension, torsion, or shear, or combinations thereof; and the particular bending or setting of the arms to the perpendicular position, inclines, curves, angle sections or the like may be chosen to give the best response of the rubber to its conditions of loading.

The arms need not be set out from the plates for some uses.

It will be obvious that the number of arms of the mounting may be reduced or multiplied to suit particular designs or mounting.

The term rubber is used to cover suitable compounds of it with other substances and synthetic rubber preparations where they are applicable.

I claim:

1. The method of making a resilient coupling or mounting for resiliently connecting two relatively movable members which comprises providing a plate, striking out a central part of the plate to simultaneously form an inner part having a central attaching portion adapted to be connected to one member and arms projecting outwardly therefrom, and an outer part having an attaching rim adapted to be connected to the other member and inwardly projecting arms formed through striking out the first mentioned arms, turning the parts to dispose the arms of one part in aligned face to face relation to the arms of the other part, and connecting the arms of one part to the arms of the other by vulcanizing rubber to their adjacent faces.

2. The method of making a resilient coupling or mounting for resiliently connecting two relatively movable members which comprises providing a plate, striking out a central part of the plate to simultaneously form an inner part having a central attaching portion adapted to be connected to one member and arms projecting outwardly therefrom and an outer part having an external attaching rim adapted to be connected to the other member and inwardly projecting arms formed through striking out the first mentioned arms, turning the parts to dispose the arms of one part in aligned face to face relation to the arms of the other part, bending the arms of the inner part inwardly and the arms of the outer part outwardly to place them in inner and outer spaced positions and connecting the arms of the inner part to the arms of the outer part by vulcanizing rubber to and between their adjacent faces.

3. The method of making a resilient coupling or mounting for resiliently connecting two relatively movable members which comprises providing a metal disc adapted to be connected at its outer margin to one member, striking out metal from the disc so as to simultaneously form a second part having a central attaching portion adapted to be connected to the other member and circumferentially spaced arms projecting outwardly therefrom with circumferentially opposite edges of each arm converging inwardly to the central attaching portion and simultaneously to form an opening centrally of the disc having outwardly projecting parts corresponding to the metal removed in forming said second part, turning the parts relatively to align the arms of the parts axially, and connecting the arms of one part to the arms of the other by rubber disposed between and vulcanized to each pair of aligned arms.

MAX GOLDSCHMIDT.